(12) United States Patent
Kobayashi et al.

(10) Patent No.: US 12,306,059 B2
(45) Date of Patent: May 20, 2025

(54) TORQUE MEASURING DEVICE

(71) Applicants: NSK Ltd., Tokyo (JP); Proterial, Ltd., Tokyo (JP)

(72) Inventors: Masahiro Kobayashi, Fukuroi (JP); Kota Fukuda, Fukuroi (JP); Hisayoshi Fukui, Fukuroi (JP); Takahiro Odera, Fukuroi (JP); Teruyuki Nakamura, Koto-ku (JP); Naoki Futakuchi, Koto-ku (JP); Ken Okuyama, Koto-ku (JP)

(73) Assignees: NSK LTD., Tokyo (JP); PROTERIAL, LTD., Tokyo (JP)

( * ) Notice: Subject to any disclaimer, the term of this patent is extended or adjusted under 35 U.S.C. 154(b) by 281 days.

(21) Appl. No.: 18/175,802

(22) Filed: Feb. 28, 2023

(65) Prior Publication Data

US 2023/0280222 A1  Sep. 7, 2023

(30) Foreign Application Priority Data

Mar. 1, 2022 (JP) .................................. 2022-031025

(51) Int. Cl.
*G01L 3/10* (2006.01)
*G01L 5/13* (2006.01)

(52) U.S. Cl.
CPC .............. *G01L 3/102* (2013.01); *G01L 3/105* (2013.01); *G01L 5/136* (2013.01)

(58) Field of Classification Search
CPC .......... G01L 3/102; G01L 3/105; G01L 5/136
See application file for complete search history.

(56) References Cited

U.S. PATENT DOCUMENTS

| | | | | |
|---|---|---|---|---|
| 4,873,874 A * | 10/1989 | Sobel | ...................... | G01L 3/105 73/862.333 |
| 4,899,598 A * | 2/1990 | Gumaste | ................. | G01L 3/103 73/DIG. 2 |
| 8,584,533 B2* | 11/2013 | Miyoshi | ................... | G01L 3/102 73/779 |
| 9,714,877 B2* | 7/2017 | Nakamura | .............. | G01L 3/102 |
| 11,698,312 B2* | 7/2023 | Fukuda | .................. | H10N 35/01 73/862.333 |

(Continued)

FOREIGN PATENT DOCUMENTS

| | | | |
|---|---|---|---|
| JP | 2016-200552 A | | 12/2016 |
| JP | 2017049124 A | * | 3/2017 |
| JP | 2022181967 A | * | 12/2022 |

*Primary Examiner* — Octavia Hollington
(74) *Attorney, Agent, or Firm* — Sughrue Mion, PLLC

(57) ABSTRACT

A torque measuring device includes: a coil unit having a detection coil configured to change a voltage in response to a change in magnetic permeability of a magnetostrictive effect section of a rotating shaft; a back yoke arranged coaxially around the coil unit; a holder configured to hold the coil unit and the back yoke; and an electronic circuit including the detection coil and configured to generate an output voltage according to a voltage of the detection coil, a clearance in a radial direction is provided between an outer peripheral surface of the coil unit and an inner peripheral surface of the back yoke, and a range of change in the clearance that accompanies temperature change during use is regulated to a range in which a change in the output voltage is linear with respect to the change in the clearance.

11 Claims, 17 Drawing Sheets

(56) References Cited

U.S. PATENT DOCUMENTS

| | | |
|---|---|---|
| 2016/0305833 A1 | 10/2016 | Nakamura |
| 2023/0280219 A1* | 9/2023 | Kobayashi .............. G01L 5/136 73/862.69 |
| 2023/0280221 A1* | 9/2023 | Kobayashi .............. G01L 3/102 73/862.193 |
| 2023/0280223 A1* | 9/2023 | Kobayashi .............. G01L 3/102 73/862.193 |

* cited by examiner

FIG. 9
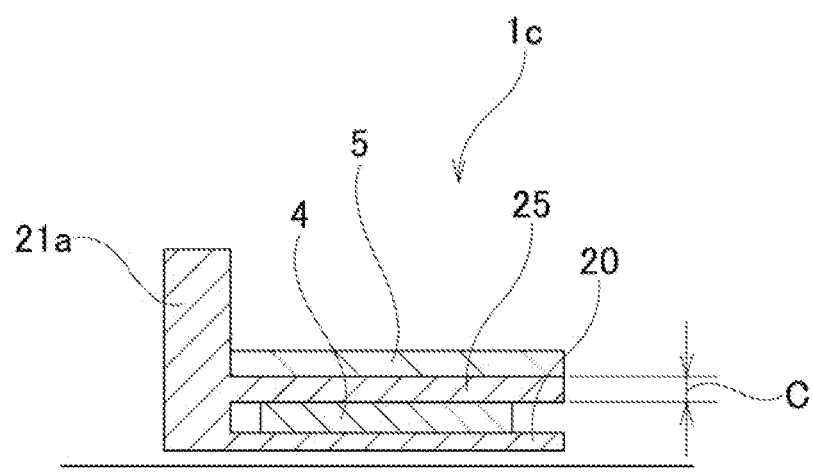
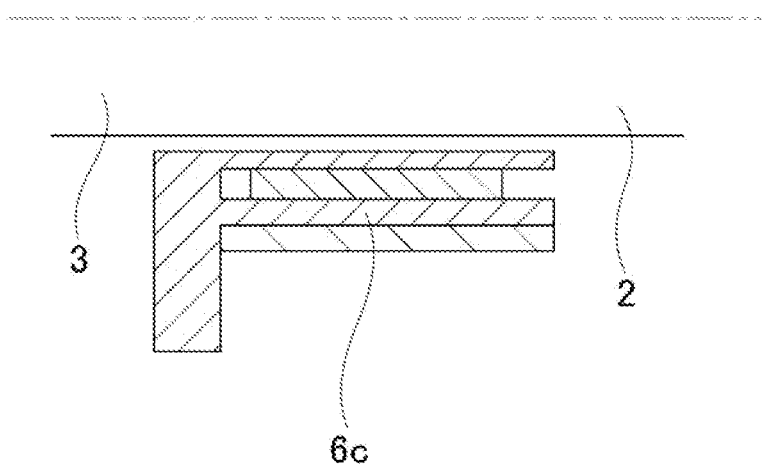

TORQUE MEASURING DEVICE

CROSS REFERENCE TO RELATED APPLICATIONS

This patent application claims the benefit of JP Patent Application No. 2022-031025 filed Mar. 1, 2022. The above application is incorporated by reference herein.

FIELD

The present disclosure relates to a torque measuring device capable of measuring torque transmitted by a rotating shaft.

BACKGROUND

In recent years, in the field of automobiles, the development of systems that measure torque transmitted by a rotating shaft of a power train, or in other words, a power transmission mechanism, use the measurement results to control output of an engine or an electric motor that is a power source, and execute speed change control of a transmission is advancing.

Conventionally, a magnetostrictive torque measuring method is known as a method for measuring torque transmitted by a rotating shaft. In the magnetostrictive torque measuring method, a magnetostrictive effect section is provided at a portion in the axial direction of a rotating shaft, and a sensor for detecting a change in magnetic permeability of the magnetostrictive effect section is arranged near the magnetostrictive effect section. When torque is applied to the rotating shaft and elastic torsional deformation occurs in the magnetostrictive effect section, the magnetic permeability of the magnetostrictive effect section changes based on an inverse magnetostrictive effect. As a result, an output signal of the sensor changes in accordance with the change in magnetic permeability of the magnetostrictive effect section, and thus torque transmitted by the rotating shaft can be measured.

For example, JP 2016-200552 A and JP 2017-049124 A describe a specific structure of a magnetostrictive torque measuring device. The torque measuring devices described in these publications include a coil unit, a back yoke, and an electronic circuit. The coil unit is configured in a cylindrical shape and arranged around a magnetostrictive effect section provided at a portion in the axial direction of a rotating shaft that transmits torque.

The coil unit has a detection coil that changes voltage in response to changes in magnetic permeability of the magnetostrictive effect section. The back yoke is a member that serves as a magnetic path for a magnetic field generated by the detection coil, is made of a magnetic material and has a cylindrical shape, and is externally fitted onto the coil unit. The electronic circuit includes the detection coil and generates an output voltage according to a voltage of the detection coil.

With a torque measuring device having such a configuration, torque transmitted by the rotating shaft can be measured based on the output voltage generated by the electronic circuit. In addition, since the back yoke is externally fitted onto the coil unit, leakage of magnetic flux to the outside is suppressed, effects due to external disturbance are reduced, and accuracy of torque measurement can be improved.

SUMMARY

In the conventional torque measuring devices described in JP 2016-200552 A and JP 2017-049124 A, when the distances between the detection coil and the rotating shaft and the back yoke change as expansion or contraction occurs in components due to temperature change, change occurs in the output voltage of the electronic circuit.

Here, since a clearance of a moderate size is originally provided between an inner peripheral surface of the coil unit and an outer peripheral surface of the rotating shaft, a change in the output voltage due to a change in the distance between the detection coil and the rotating shaft caused by a change in temperature is generally a linear change. Therefore, such a change in the output voltage can be easily corrected using temperature that is separately detected.

On the other hand, the back yoke is externally fitted onto the coil unit, in other words, no clearance is provided between the inner peripheral surface of the back yoke and the outer peripheral surface of the coil unit, and thus when the distance between the detection coil and the back yoke changes due to a gap between the outer peripheral surface of the coil unit and the inner peripheral surface of the back yoke due to temperature change, the effect appears as a nonlinear change in the output voltage. Therefore, in order to correct such a change in output voltage, problems arise such as a need to use a temperature correction circuit with a complicated configuration.

An object of the present disclosure is to provide a torque measuring device capable of simplifying correction of output voltage due to temperature changes during use.

The torque measuring device according to an aspect of the present disclosure includes a coil unit, a back yoke, a holder, and an electronic circuit.

The coil unit is formed into a cylindrical shape as a whole and has a detection coil configured to change a voltage in response to a change in magnetic permeability of a magnetostrictive effect section of a rotating shaft, the magnetic permeability changing according to torque to be transmitted.

The back yoke is formed in a cylindrical shape and arranged coaxially around the coil unit.

The holder is configured to hold the coil unit and the back yoke.

The electronic circuit includes the detection coil and is configured to generate an output voltage according to a voltage of the detection coil.

In the torque measuring device according to an aspect of the present disclosure, a clearance in a radial direction is provided between an outer peripheral surface of the coil unit and an inner peripheral surface of the back yoke, and a range of change in the clearance that accompanies temperature change during use is regulated to a range in which a change in the output voltage is linear with respect to the change in the clearance.

In the torque measuring device according to an aspect of the present disclosure, a spacer is provided to be sandwiched between the outer peripheral surface of the coil unit and the inner peripheral surface of the back yoke, and the clearance is formed by the spacer.

In the torque measuring device according to an aspect of the present disclosure, the holder has a holder cylindrical portion, and the holder cylindrical portion forms the spacer. The coil unit is fitted into the holder cylindrical portion, and the back yoke is fitted onto the holder cylindrical portion.

In the torque measuring device according to an aspect of the present disclosure, the holder has a holder cylindrical portion;
   the back yoke is embedded in the holder cylindrical portion; and a portion of the holder cylindrical portion located between the inner peripheral surface of the back yoke and the outer peripheral surface of the coil unit forms the spacer.

In the torque measuring device according to an aspect of the present disclosure, the holder has an inner protection portion positioned on the inner side in the radial direction of the inner peripheral surface of the coil unit.

In the torque measuring device according to an aspect of the present disclosure, the holder has an inner cylindrical portion arranged on the inner side in the radial direction of the coil unit, and the inner cylindrical portion forms the inner protection portion.

In the torque measuring device according to an aspect of the present disclosure, the holder includes an inward facing flange portion that protrudes inward in the radial direction from at least one of end portions on both sides in the axial direction of the holder cylindrical portion, the inward facing flange portion having an inner end portion in the radial direction positioned on the inner side in the radial direction of the inner peripheral surface of the coil unit, and the inner end portion in the radial direction of the inward facing flange portion forming the inner protection portion.

In the torque measuring device according to an aspect of the present disclosure, the holder has a holder cylindrical portion; the coil unit is embedded in the holder cylindrical portion; the back yoke is fitted onto the holder cylindrical portion; a part of the holder cylindrical portion located between the outer peripheral surface of the coil unit and the inner peripheral surface of the back yoke forms the spacer; and a portion of the holder cylindrical portion located on the inner side in the radial direction of the inner peripheral surface of the coil unit forms the inner protection portion.

In the torque measuring device according to an aspect of the present disclosure, the coil unit is configured by a flexible substrate.

In the torque measuring device according to an aspect of the present disclosure, the coil unit is configured by a flexible substrate; and a band-shaped member fixed to the flexible substrate is sandwiched between the outer peripheral surface of the coil unit and the inner peripheral surface of the back yoke, and the band-shaped member forms the spacer.

With the torque measuring device according to an aspect of the present disclosure, it is possible to simplify correction of output voltage due to temperature change during use.

BRIEF DESCRIPTION OF THE DRAWINGS

To assist those of ordinary skill in the relevant art in making and using the Subject matter hereof, reference is made to the appended drawings, in which like reference numerals refer to similar elements.

FIG. 9 is a cross-sectional view of a torque measuring device according to a fourth example of an embodiment of the present disclosure.

It should be understood that the drawings are not to scale and that the disclosed embodiments are sometimes illustrated diagrammatically and in partial views. In certain instances, details that are not necessary for an understanding of the disclosed method and apparatus, or that would render other details difficult to perceive may have been omitted. It should be understood that this disclosure is not limited to the particular embodiments illustrated herein.

DETAILED DESCRIPTION

In the following detailed description of some embodiments, reference is made to the accompanying drawings, which form a part hereof, and within which are shown by way of illustration specific embodiments by which the disclosure may be practiced. It is to be understood that other embodiments may be utilized, and structural changes may be made without departing from the scope of the disclosure.

First Example

A first example of an embodiment of the present disclosure will be described with reference to FIGS. 1 to 6.

A torque measuring device 1 of this example is a device for measuring the torque transmitted by a rotating shaft 2, and can be used by being incorporated in various mechanical devices. Specific examples of such a mechanical device incorporating the torque measuring device 1 of the present example include: a mechanical device of a power train of an automobile, for example, a transmission such as an automatic transmission (AT), a belt-type continuously variable transmission, a toroidal type continuously variable transmission, an automatic manual transmission (AMT), a dual clutch transmission (DCT) or the like that performs gear shifting that is controlled on the vehicle side; or a transfer, a manual transmission (MT), or the like. The driving system of the target vehicle is not particularly limited and may be FF, FR, MR, RR, 4WD, or the like.

Specific examples of the other mechanical device incorporating the torque measuring device 1 of the present example include devices that change a rotation speed of a power shaft with gears such as a speed reducer or a speed increaser of a wind turbine, a railway vehicle, a rolling mill for steel, and the like.

In this example, the rotating shaft 2 is a rotating shaft incorporated in a mechanical device of a power train as described above, and is rotatably supported by a rolling bearing (not illustrated) with respect to a casing (not illustrated) that does not rotate during use, and has a magnetostrictive effect section, the magnetic permeability of which changes according to torque to be transmitted.

Figure 1:
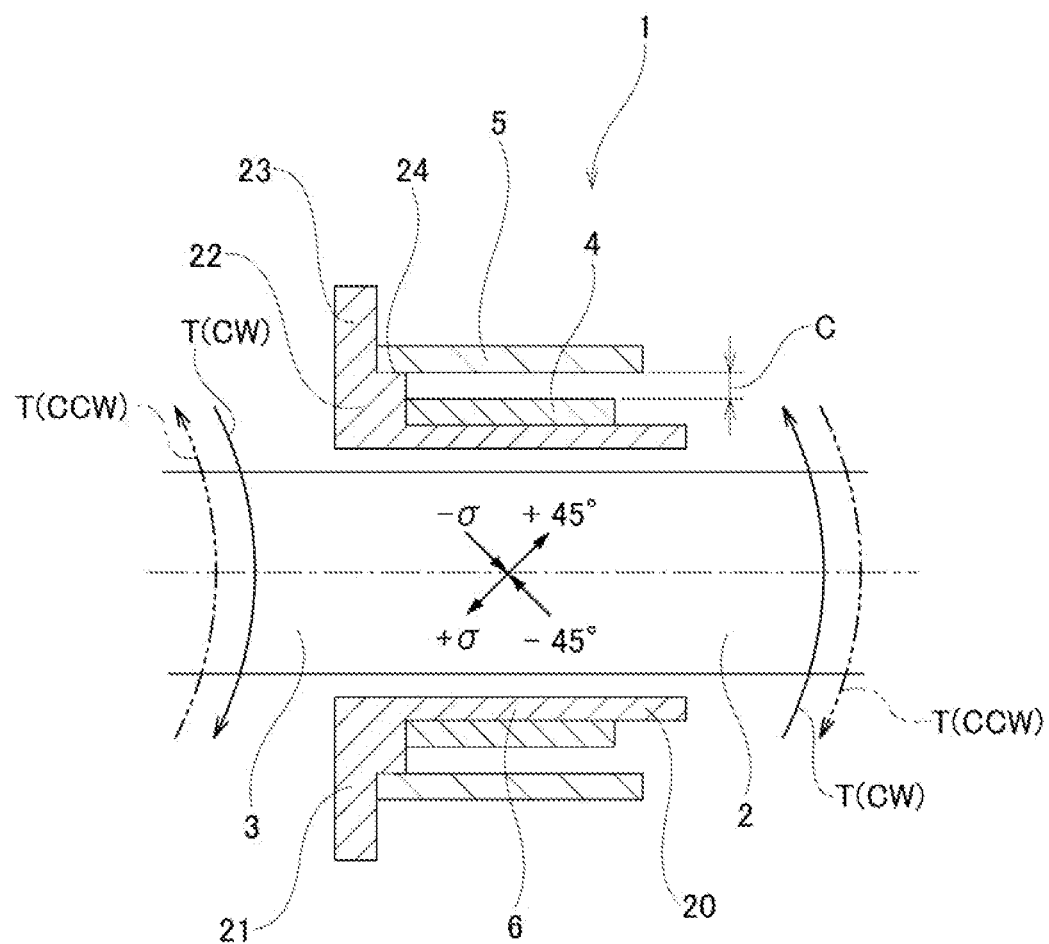
FIG. 1 is a cross-sectional view of a torque measuring device according to a first example of an embodiment of the present disclosure.

The rotating shaft 2 has an intermediate shaft portion 3 at an intermediate portion in an axial direction thereof as illustrated in FIG. 1. An outer peripheral surface of the intermediate shaft portion 3 is configured by a cylindrical surface. In this example, the intermediate shaft portion 3 of the rotating shaft 2 functions as a magnetostrictive effect section. For this reason, the rotating shaft 2 is made of a magnetic metal. As the magnetic metal forming the rotating shaft 2, various magnetic steels can be used such as carburized steel such as SCr420 and SCM420, and carbon steel such as S45C, which are defined in the Japanese Industrial Standards (JIS).

When a torque is applied to the rotating shaft 2 and the intermediate shaft portion 3 is torsionally deformed, the intermediate shaft portion 3 is subjected to a stress corresponding to the torque, that is, a tensile stress acts in the +45° direction with respect to the axial direction and a compressive stress acts in the −45° direction with respect to the axial direction. As this occurs, the magnetic permeability in each direction of the intermediate shaft portion 3 changes due to an inverse magnetostriction effect.

When carrying out the present disclosure, it is possible to improve the mechanical and magnetic properties of a portion of the outer peripheral surface of the intermediate shaft portion 3 that faces the detection coil 8 of the torque measuring device 1 by subjecting the portion to a shot peening process to form a compression work hardened layer. In this way, sensitivity and hysteresis of torque measurement by the torque measuring device 1 may be improved.

When carrying out the present invention, instead of having the intermediate shaft portion 3 function as the magnetostrictive effect section, it is also possible to fix a magnetostrictive material functioning as the magnetostrictive effect section to an outer peripheral surface of the intermediate shaft portion 3. More specifically, an annular-shaped magnetostrictive material may be fitted around the intermediate shaft portion 3 and fixed, or a magnetostrictive material composed of a film coating such as plating or a film-like magnetostrictive material may be fixed to the outer peripheral surface of the intermediate shaft portion 3.

The torque measuring device 1 of this example includes a coil unit 4, a back yoke 5, a holder 6, and an electronic circuit 7. The torque measuring device 1 of this example has an annular shape as a whole, and is supported and fixed to the casing while being arranged coaxially around the intermediate shaft portion 3.

The coil unit 4 has a detection coil 8 that changes voltage in response to changes in magnetic permeability of the intermediate shaft portion 3, and has a cylindrical shape as a whole. The coil unit 4 is arranged coaxially around the intermediate shaft portion 3.

Figure 2A:
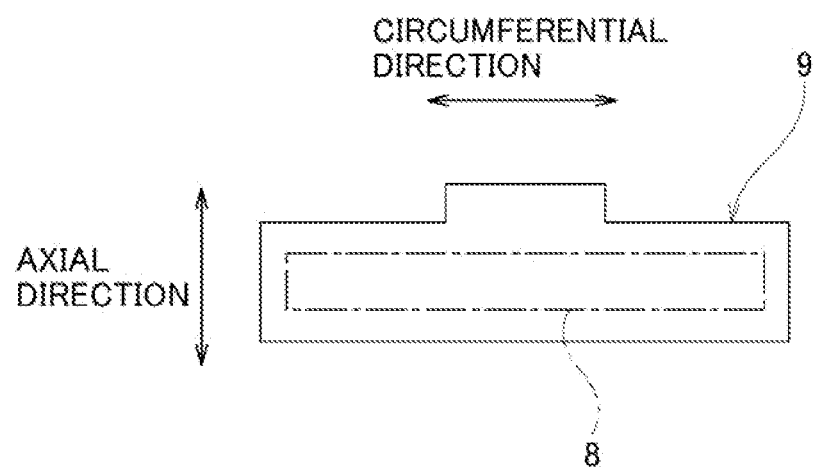
FIG. 2A is a developed view of a flexible substrate of a coil unit of the first example.
Figure 2B:
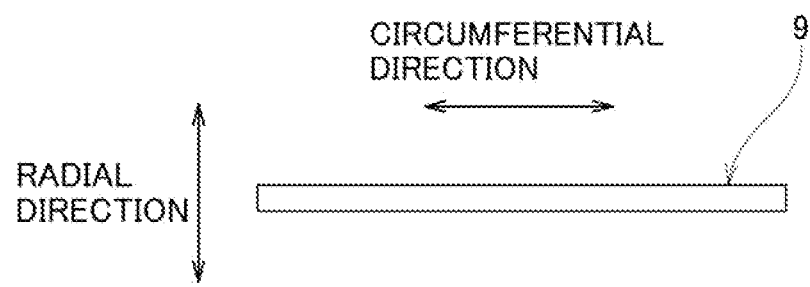
FIG. 2B is a view as seen from below the flexible substrate in FIG. 2A.

In this example, the coil unit 4 is configured by a flexible substrate (FPC) including a base film and printed wiring (conductors) held by the base film. More specifically, the coil unit 4 is configured by rounding the band-shaped flexible substrate 9 as illustrated in FIGS. 2A-2B into a cylindrical shape, and joining both ends in the length direction of the flexible substrate 9, for example.

In this example, the detection coil 8 includes a first split coil 10, a second split coil 11, a third split coil 12, and a fourth split coil 13 provided on the flexible substrate 9. That is, the flexible substrate 9 has four wiring layers that are layered in the substrate thickness direction, and a first split coil 10, a second split coil 11, a third split coil 12, and a fourth split coil 13, each of which is configured by printed wiring, are arranged on these wiring layers.

In a state in which the band-shaped flexible substrate 9 is rolled into a cylindrical shape, that is, in a state in which the coil unit 4 having a cylindrical shape is formed, these split coils 10 to 13 are arranged in order of the first split coil 10, the second split coil 11, the third split coil 12, and the fourth split coil 13 from the inner side in the radial direction.

Figure 3:
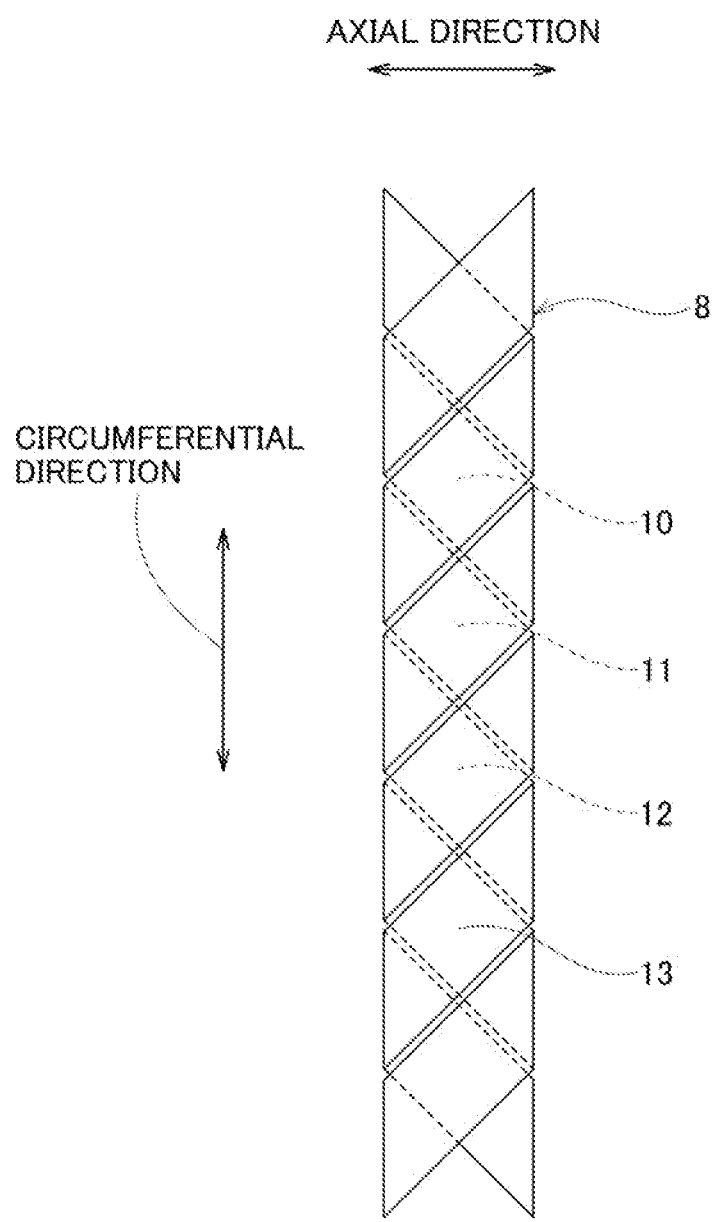
FIG. 3 is a developed view of a detection coil of the coil unit of the first example as seen from outside in the radial direction.
Figure 4:
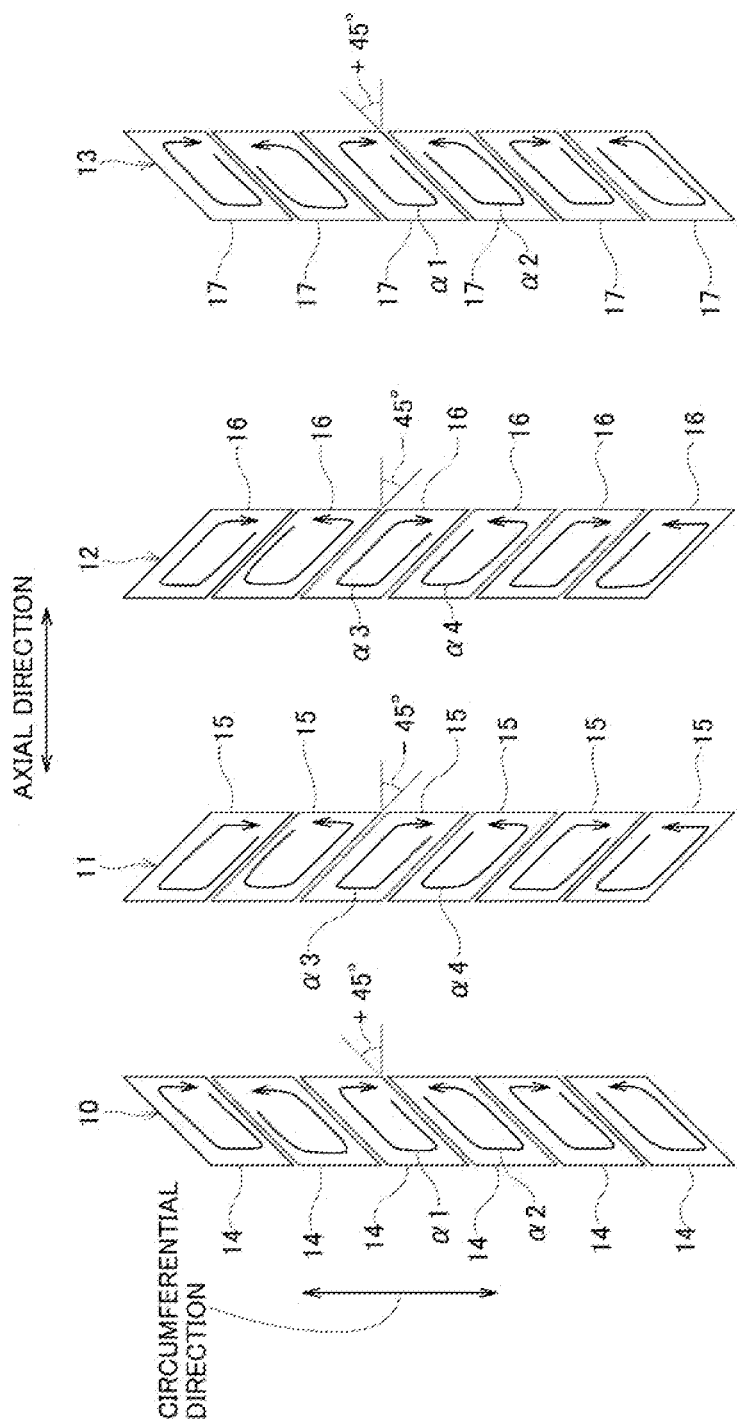
FIG. 4A to FIG. 4D illustrate a first split coil, a second split coil, a third split coil, and a fourth split coil of the detection coil of the coil unit of the first example, and are developed views of each single unit viewed from the outside in the radial direction.

FIG. 3 is a developed view of the detection coil 8 as viewed from the outside in the radial direction of the coil unit 4. FIG. 4A to FIG. 4D are developed views of the first split coil 10, the second split coil 11, the third split coil 12, and the fourth split coil 13 of the detection coil 8 as seen from the outside in the radial direction of the coil unit 4.

As illustrated in FIG. 4A, the first split coil 10 includes coil pieces 14 arranged side by side at equal pitches in a circumferential direction. These coil pieces 14 have a parallelogram shape when viewed from the radial direction, and include wiring that is inclined +45° with respect to the axial direction of the intermediate shaft portion 3. Coil pieces 14 that are adjacent in the circumferential direction are connected in series by a conductor such as printed wiring (not illustrated).

That is, in FIG. 4A, the coil pieces 14 are schematically illustrated, and illustrated as if the entire circumference is connected; however, actually, discontinuous portions exist in a part of the coil pieces 14 in the circumferential direction. The coil pieces 14 have two end portions that are separated across discontinuous portions. Coil pieces 14 that are adjacent in the circumferential direction are connected in series by connecting one end of each with a conductor such as printed wiring (not illustrated). These aspects are the same for the second split coil 11 to the fourth split coil 13 below.

As illustrated in FIG. 4B, the second split coil 11 includes coil pieces 15 arranged side by side at equal pitches in the circumferential direction. These coil pieces 15 have a parallelogram shape when viewed from the radial direction, and include wiring that is inclined −45° with respect to the axial direction of the intermediate shaft portion 3. Coil pieces 15 that are adjacent in the circumferential direction are connected in series by a conductor such as printed wiring (not illustrated).

As illustrated in FIG. 4C, the third split coil 12 includes coil pieces 16 arranged side by side at equal pitches in the circumferential direction. These coil pieces 16 have a parallelogram shape when viewed from the radial direction, and include wiring that is inclined −45° with respect to the axial direction of the intermediate shaft portion 3. Coil pieces 16 that are adjacent in the circumferential direction are connected in series by a conductor such as printed wiring (not illustrated).

As illustrated in FIG. 4D, the fourth split coil 13 includes coil pieces 17 arranged side by side at equal pitches in the circumferential direction. These coil pieces 17 have a parallelogram shape when viewed from the radial direction, and include wiring that is inclined +45° with respect to the axial direction of the intermediate shaft portion 3. Coil pieces 17 that are adjacent in the circumferential direction are connected in series by a conductor such as printed wiring (not illustrated).

When carrying out the present disclosure, the first split coil 10, the second split coil 11, the third split coil 12, and the fourth split coil 13 may be formed by winding wires around a supporting member such as a bobbin formed in a cylindrical shape. In addition, when carrying out the present disclosure, configuration regarding the specific shape and arrangement of the first split coil, second split coil, third split coil, and fourth split coil that constitute the detection coil is not limited to the configuration of this example, and various conventionally known configurations may be adopted.

The back yoke 5 is a member that forms a magnetic path for magnetic flux generated by the detection coil 8. The back yoke 5 is made of a magnetic material such as mild steel and is formed in a cylindrical shape as a whole. The back yoke 5 is arranged coaxially around the coil unit 4.

In this example, in this state, a clearance C in the radial direction is provided along the axial direction between the coil unit 4 and the back yoke 5, as illustrated in FIG. 1. That is, an outer peripheral surface of the coil unit 4 and an inner peripheral surface of the back yoke 5 are separated by the clearance C in the radial direction. In this example, nothing is arranged between the outer peripheral surface of the coil unit 4 and the inner peripheral surface of the back yoke 5, and a cylindrical space exists. That is, in this example, the radial clearance C is formed by the cylindrical space.

The holder 6 is a member that holds the coil unit 4 and the back yoke 5. In this example, the holder 6 is made of synthetic resin, is formed in an annular shape as a whole, and has an L-shaped cross section. The holder 6 includes a cylindrical inner cylindrical portion 20 arranged at an inner side in the radial direction of the coil unit 4, and a holder annular portion 21 having an annular shape and extending outward in the radial direction from an end portion on one side in the axial direction (left side in FIG. 1) of the inner cylindrical portion 20.

In this example, the inner cylindrical portion 20 forms an inner protective portion located on the inner side in the radial direction of the inner peripheral surface of the coil unit 4. In this example, the holder annular portion 21 has a thick portion 22 forming an inner half portion in the radial direction and a thin portion 23 forming an outer half portion in the radial direction. The holder 6 has a cylindrical stepped portion 24 facing outward in the radial direction, and connects a side surface on the other side in the axial direction (right side in FIG. 1) of the thick portion 22 and a side surface on the other side in the axial direction of the thin portion 23. The holder 6 is supported and fixed to the casing while being arranged coaxially around the intermediate shaft portion 3 of the rotating shaft 2.

In this example, the coil unit 4 is externally fitted and fixed without looseness in the radial direction to the inner cylindrical portion 20 by adhesion or the like. An end portion on one side in the axial direction (left side in FIG. 1) of the back yoke 5 is tightly fitted to the stepped portion 24, and is externally fixed without looseness in the radial direction by adhesion or the like.

The electronic circuit 7 includes the detection coil 8 and generates an output voltage according to the voltage of the detection coil 8.

Figure 5:
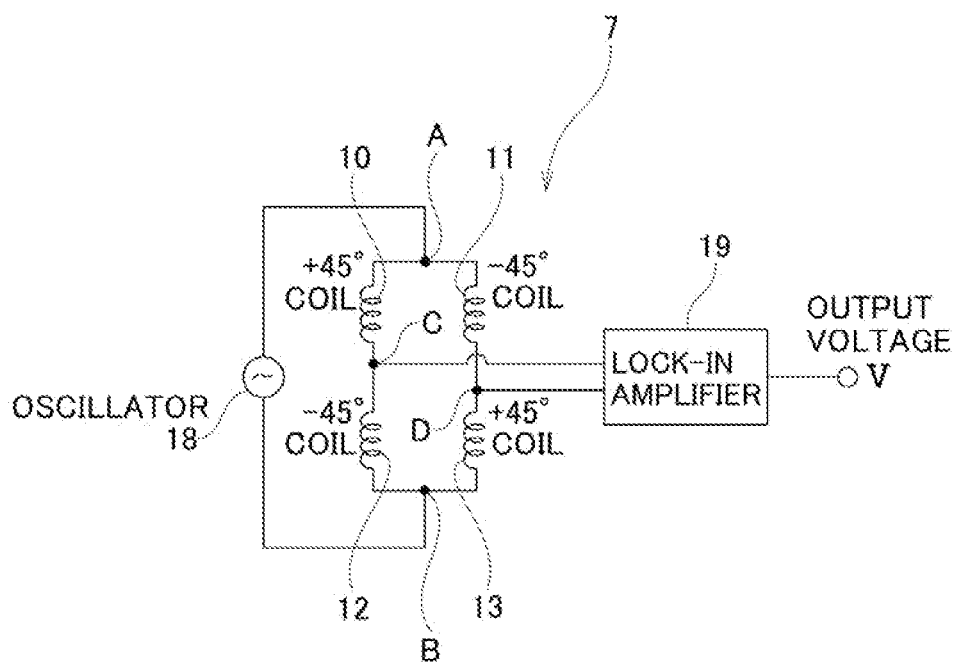
FIG. 5 is a diagram illustrating an electronic circuit in the torque measuring device of the first example.

In this example, as illustrated in FIG. 5, the electronic circuit 7 includes a bridge circuit in which the first split coil 10, the second split coil 11, the third split coil 12, and the fourth split coil 13 are arranged on four sides thereof. The electronic circuit 7, in addition to the first split coil 10, the second split coil 11, the third split coil 12, and the fourth split coil 13, includes an oscillator 18 for applying an AC voltage between points A and B, and a lock-in amplifier 19 for detecting and amplifying a midpoint voltage (differential voltage) that is a potential difference between points C and D.

Of the components of the electronic circuit 7, components other than the detection coil 8 may be fixed to the flexible substrate 9 or another substrate (not illustrated), for example.

When the torque measuring device 1 of this example is used, an alternating voltage is applied between points A and B of the electronic circuit 7 by the oscillator 18, and an alternating current is passed through the first split coil 10, the second split coil 11, the third split coil 12, and the fourth split coil 13. Then, as indicated by arrows α1, α2, α3, and α4 in FIG. 4A to FIG. 4D, in the first split coil 10, the second split coil 11, the third split coil 12, and the fourth split coil 13, currents flow in mutually opposite directions between pairs of coil pieces 14, 15, 16, and 17 adjacent in the circumferential direction.

In other words, pairs of coil pieces 14, 15, 16, and 17 adjacent in the circumferential direction are connected to each other so that the current flows in such directions. As a result, an alternating magnetic field is generated around the first split coil 10, the second split coil 11, the third split coil 12, and the fourth split coil 13, and part of the magnetic flux of this alternating magnetic field passes through a surface layer portion of the intermediate shaft portion 3.

In this state, when a torque T in a direction indicated by arrow CW in FIG. 1 is applied to the intermediate shaft portion 3, a tensile stress (+σ) in a +45° direction with respect to the axial direction and a compressive stress (−σ) in a −45° direction with respect to the axial direction act on the rotating shaft 2. Then, due to an inverse magnetostriction effect, the magnetic permeability of the intermediate shaft portion 3 increases in the +45° direction, which is the direction in which the tensile stress (+σ) acts, and the magnetic permeability of the intermediate shaft portion 3 decreases in the −45° direction, which is the direction in which the compressive stress (−σ) acts.

On the other hand, the first split coil 10 and the fourth split coil 13 are configured to include wiring inclined +45° with respect to the axial direction of the intermediate shaft portion 3, and part of the magnetic flux of the alternating magnetic field generated around the wiring passes through the surface layer of the intermediate shaft portion 3 in the −45° direction, which is the direction in which the magnetic permeability decreases. Therefore, the inductances of the first split coil 10 and the fourth split coil 13 decrease.

In addition, the second split coil 11 and the third split coil 12 are configured to include wiring inclined −45° with respect to the axial direction of the intermediate shaft portion 3, and part of the magnetic flux of the alternating magnetic field generated around the wiring passes through the surface layer of the intermediate shaft portion 3 in the +45° direction, which is the direction in which the magnetic permeability increases. Therefore, the inductances of the third split coil 12 and the fourth split coil 13 increase.

In contrast, when a torque T is applied to the intermediate shaft portion 3 in a direction indicated by arrow CCW in FIG. 1, due to action opposite to the case described above, the inductances of the first split coil 10 and the fourth split coil 13 increase, and the inductances of the second split coil 11 and the third split coil 12 decrease.

In either case, in the electronic circuit 7, the lock-in amplifier 19 detects and amplifies the midpoint voltage, which is the potential difference between the points C and D, and as a result, an output voltage V corresponding to the direction and magnitude of the torque T applied to the rotating shaft 2 is obtained.

In the torque measuring device 1 of this example, each component of the torque measuring device 1 expands or contracts due to temperature changes during use. Accordingly, the clearance C in the radial direction existing between the outer peripheral surface of the coil unit 4 and the inner peripheral surface of the back yoke 5 changes, and as a result the output voltage V of the electronic circuit 7 changes.

Figure 6:
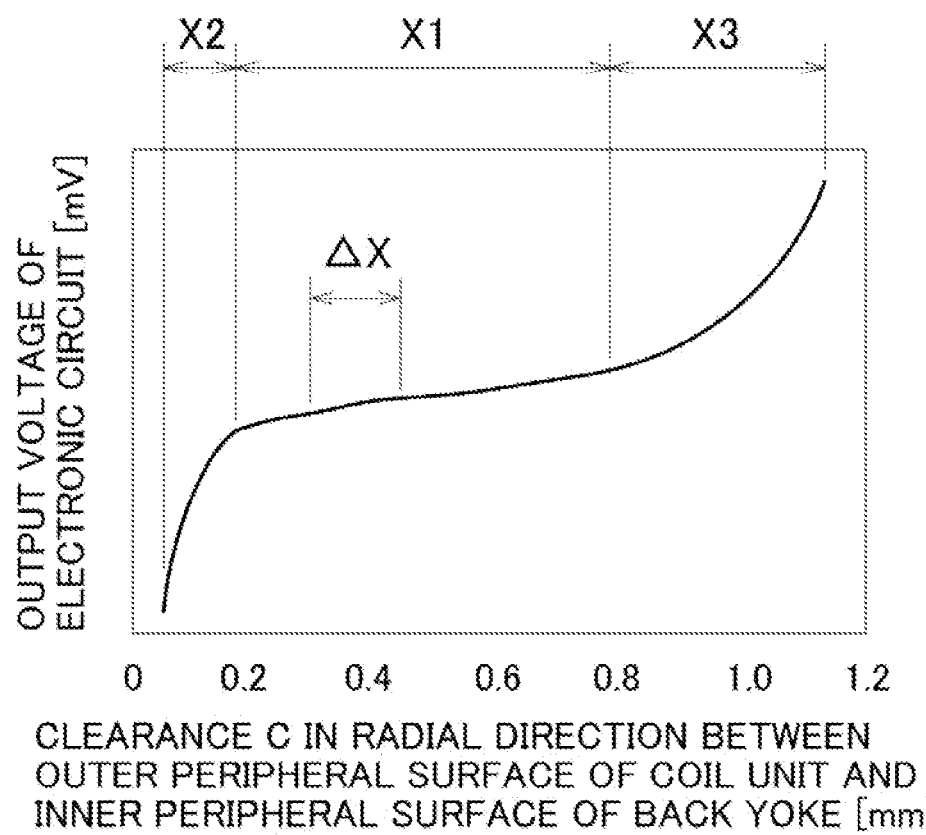
FIG. 6 is a graph conceptually illustrating a relationship between a radial clearance C between an outer peripheral surface of the coil unit and an inner peripheral surface of a back yoke and an output voltage V of the electronic circuit in the torque measuring device of the first example.

FIG. 6 is a graph conceptually illustrating a relationship between the clearance C in the radial direction and the output voltage V of the electronic circuit 7 in the torque measuring device 1 of this example. Note that the graph illustrated in FIG. 6, including the numerical values on the horizontal axis, is an example. The graph illustrated in FIG. 6 can be obtained based on simulation analysis or experimentation.

As illustrated in this graph, in the range of clearance C in the radial direction, there is a range X1 in which linearity is indicated between the change in the clearance C in the radial direction and the change in the output voltage V of the electronic circuit 7, and on both sides of the range X1, there are ranges X2, X3 in which non-linearity is exhibited between the change in the clearance C in the radial direction and the change in the output voltage V of the electronic circuit 7.

That is, in the range X2 in which the clearance C in the radial direction is smaller than a predetermined value, or in the range X3 in which the clearance C in the radial direction is larger than a predetermined value, the change in the output voltage V of the electronic circuit 7 is non-linear, that is, non-linear change with respect to the change in the clearance C in the radial direction that accompanies temperature changes during use.

On the other hand, in the intermediate range X1 sandwiched between the range X2 and the range X3, the change in the output voltage V of the electronic circuit 7 is linear, that is, the change is linear with respect to the change in the clearance C in the radial direction due to the change in temperature during use. Therefore, a correction value of the output voltage V with respect to the change in the clearance C also changes linearly, and correction can be performed easily and accurately.

Therefore, in the torque measuring device 1 of this example, the change range ΔX of the clearance C in the radial direction due to temperature changes during use is regulated so as to fall within the range X1 in which the change in the output voltage V of the electronic circuit 7 is linear with respect to the change in the clearance C in the radial direction is linear change. More specifically, the clearance C in the radial direction at room temperature is set so that the change range ΔX falls within the range X1 (0.2 mm to 0.8 mm in the illustrated example).

As described above, in the torque measuring device 1 of this example, the change range ΔX of the clearance C in the radial direction due to temperature changes during use is regulated so as to fall within the range X1 in which the change in the output voltage V of the electronic circuit 7 is linear with respect to the change in the clearance C in the radial direction. Therefore, the change in the output voltage V of the electronic circuit 7 due to temperature change during use can be easily corrected using separately detected temperature. That is, for example, the clearance C due to temperature change is calculated, and the torque T can be measured with the output voltage V corresponding to the clearance C as a reference.

In this example, the inner cylindrical portion 20 is arranged at an inner side in the radial direction of the coil unit 4. Therefore, when the torque measuring device 1 is assembled around the rotating shaft 2, the inner cylindrical portion 20 can prevent the inner peripheral surface of the coil unit 4 from colliding with the outer peripheral surface of the rotating shaft 2.

Second Example

Figure 7:
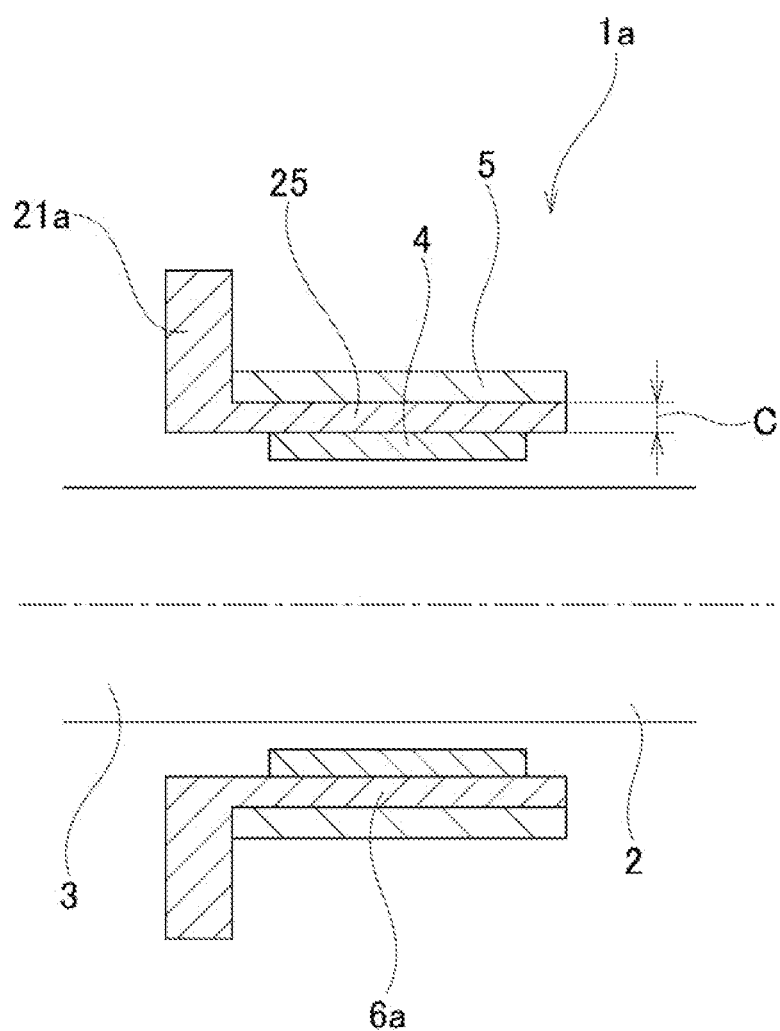
FIG. 7 is a cross-sectional view of a torque measuring device according to a second example of an embodiment of the present disclosure.

A second example of an embodiment of the present disclosure will be described with reference to FIG. 7.

In a torque measuring device 1a of this example, a holder 6a includes a holder cylindrical portion 25 having a cylindrical shape and a holder annular portion 21a having an annular shape and extending outward in the radial direction from one axial end (left side in FIG. 7) of the holder cylindrical portion 25. The holder annular portion 21a has a uniform plate thickness as a whole.

A coil unit 4 is internally fitted and fixed to the holder cylindrical portion 25 without looseness in the radial direction. A back yoke 5 is externally fitted and fixed to the holder cylindrical portion 25 without looseness in the radial direction. That is, the holder cylindrical portion 25, corresponding to a spacer, is sandwiched between an outer peripheral surface of the coil unit 4 and an inner peripheral surface of the back yoke 5, and the holder cylindrical portion forms a clearance C in the radial direction.

In this example, the holder cylindrical portion 25 is sandwiched between the outer peripheral surface of the coil unit 4 and the inner peripheral surface of the back yoke 5, and thus it is easy to ensure coaxiality between the coil unit 4 and the back yoke 5, and it is easy to maintain the coaxiality. Note that as a modification of this example, it is possible to employ a configuration in which the holder does not have a holder annular portion, that is, a configuration in which the holder has only the holder cylindrical portion, and such a modification is also within the scope of the present disclosure. Other configurations and effects are the same as those of the first example.

Third Example

Figure 8:
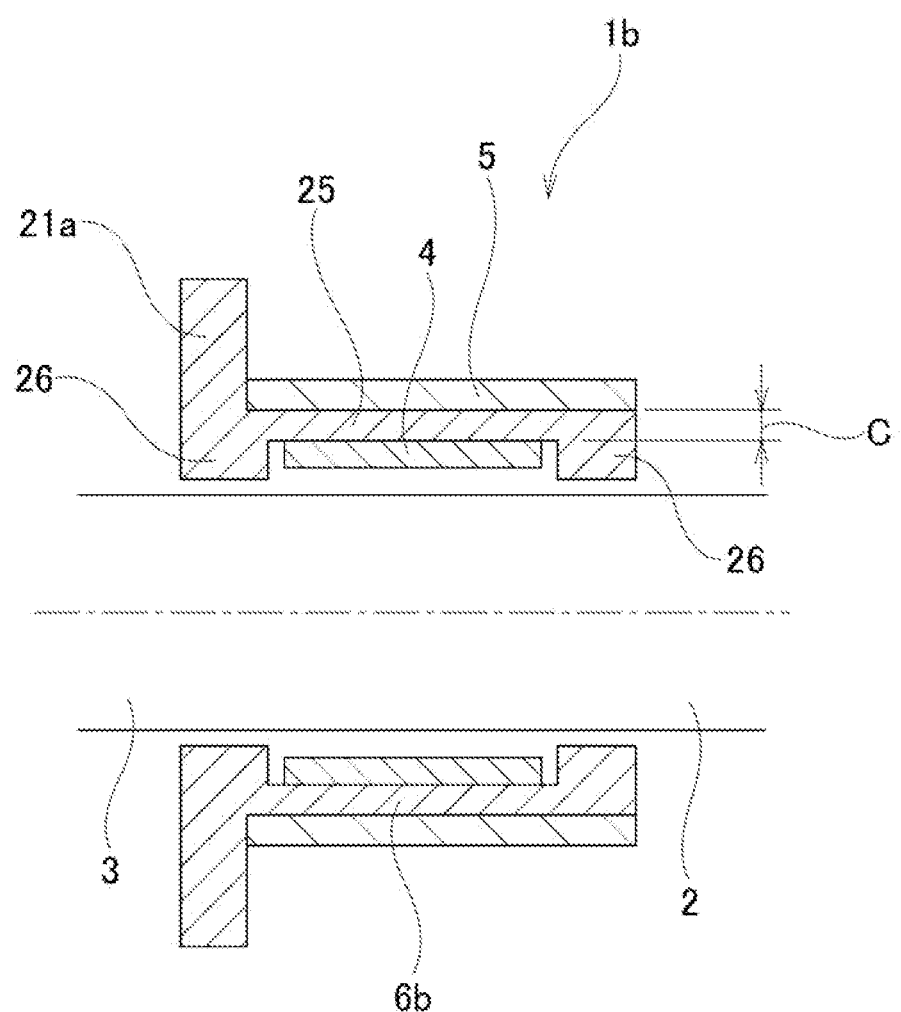
FIG. 8 is a cross-sectional view of a torque measuring device according to a third example of an embodiment of the present disclosure.

A third example of an embodiment of the present disclosure will be described with reference to FIG. 8.

In a torque measuring device 1b of this example, a holder 6b has two inward facing flange portions 26 protruding inward in the radial direction from end portions on both sides in the axial direction of a holder cylindrical portion 25. In this example, a coil unit 4 is arranged in the axial direction between the two inward facing flange portions 26.

Each inner diameter of the two inward facing flange portions 26 is smaller than an inner diameter of the coil unit 4. That is, inner end portions in the radial direction of the inward facing flange portions 26 are positioned on the inner side in the radial direction of the inner peripheral surface of the coil unit 4. In this example, the inner end portions in the radial direction of these inward facing flange portions 26 form an inner protection portion.

In this example, the inner end portions in the radial direction of the two inward facing flange portions 26 are positioned on the inner side in the radial direction of the inner peripheral surface of the coil unit 4, and thus when assembling the torque measuring device 1b around the rotating shaft 2, it is possible to prevent the inner peripheral surface of the coil unit 4 from colliding with the outer peripheral surface of the rotating shaft 2 by the inner end portions in the radial direction of the two inward facing flange portions 26.

However, as a modification of this example, a configuration is possible in which one of the two inward facing flange portions is omitted, that is, a configuration is possible in which the holder has a T-shaped or crank-shaped cross-sectional shape, and an inwardly facing flange portion protruding inward in the radial direction from either one end portion in the axial direction (base end portion) or the other end portion in the axial direction (tip-end portion) of the cylindrical portion of the holder, and such modifications are also within the scope of the present disclosure. Other configurations and effects are the same as those of the first and second examples.

Fourth Example

A fourth example of an embodiment of the present disclosure will be described with reference to FIG. 9.

In a torque measuring device 1c of this example, a holder cylindrical portion 25 of a holder 6c extends in an axial direction from an intermediate portion in the radial direction of a holder annular portion 21a. The holder 6c has a cylindrical inner cylindrical portion 20 that extends in the axial direction from an end portion in the radial direction of the holder annular portion 21a, and is arranged coaxially with the holder cylindrical portion 25.

In this example, a coil unit 4 is inserted between an inner peripheral surface of the holder cylindrical portion 25 and an outer peripheral surface of the inner cylindrical portion 20 without looseness in the radial direction.

In this example, the work of assembling the coil unit 4 in the holder 6c can be performed by axially inserting the coil unit 4 between the inner peripheral surface of the holder cylindrical portion 25 and the outer peripheral surface of the inner cylindrical portion 20, and thus the assembling work can be performed easily.

Note that as a modification of this example, it is possible to provide an outer cylindrical portion on the outer side in the radial direction of the holder cylindrical portion 25 so as to extend in the axial direction 1 from the intermediate portion in the radial direction of the holder annular portion 21a, and to insert a back yoke 5 between the outer peripheral surface of the holder cylindrical portion 25 and the inner peripheral surface of the outer cylindrical portion without looseness in the radial direction. Other configurations and effects are the same as those of the first and second examples.

Fifth Example

Figure 10:
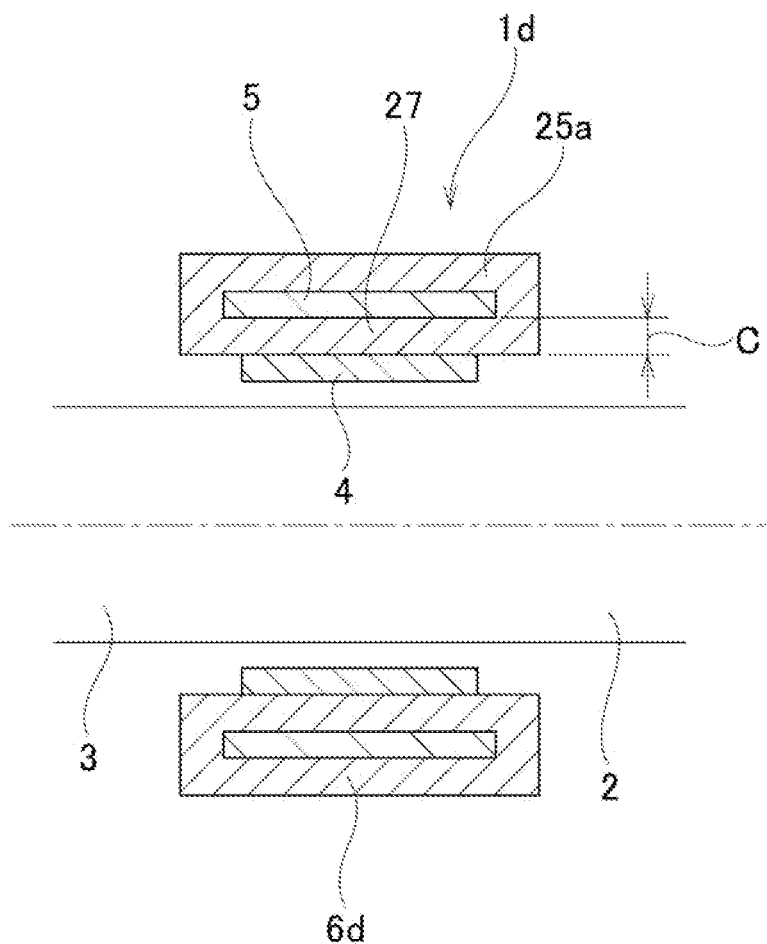
FIG. 10 is a cross-sectional view of a torque measuring device according to a fifth example of an embodiment of the present disclosure.

A fifth example of an embodiment of the present disclosure will be described with reference to FIG. 10.

In a torque measuring device 1d of this example, a holder 6d is made of a non-conductive material such as elastomer including rubber or synthetic resin, and includes a cylindrical holder cylindrical portion 25a, and more specifically, includes only the holder cylindrical portion 25a. In this example, a back yoke 5 is embedded in the holder cylindrical portion 25a while being arranged coaxially with the holder cylindrical portion 25a. As a result, an entire surface of the back yoke 5 is covered by the holder cylindrical portion 25a.

A coil unit 4 is internally fitted and fixed to an inner peripheral surface of the holder cylindrical portion 25a without looseness in the radial direction. In this example, of the holder cylindrical portion 25a, a cylindrical sandwiched portion 27 that is a portion sandwiched between an outer peripheral surface of the coil unit 4 and an inner peripheral surface of the back yoke 5 corresponds to a spacer and forms a clearance C.

In this example, the sandwiched portion 27 is sandwiched between the outer peripheral surface of the coil unit 4 and the inner peripheral surface of the back yoke 5, and thus it is easy to ensure coaxiality between the coil unit 4 and the back yoke 5, and it is easy to maintain the coaxiality.

Note that as a modification of this example, it is possible to employ a configuration in which an inward facing flange portion is provided that protrudes inward in the radial direction from one end portion or both end portions in the axial direction of the holder cylindrical portion, and an inner end portion in the radial direction of the inward facing flange portion is positioned on the inner side in the radial direction of the inner peripheral surface of the coil unit. Other configurations and effects are the same as those of the first example.

Sixth Example

Figure 11:
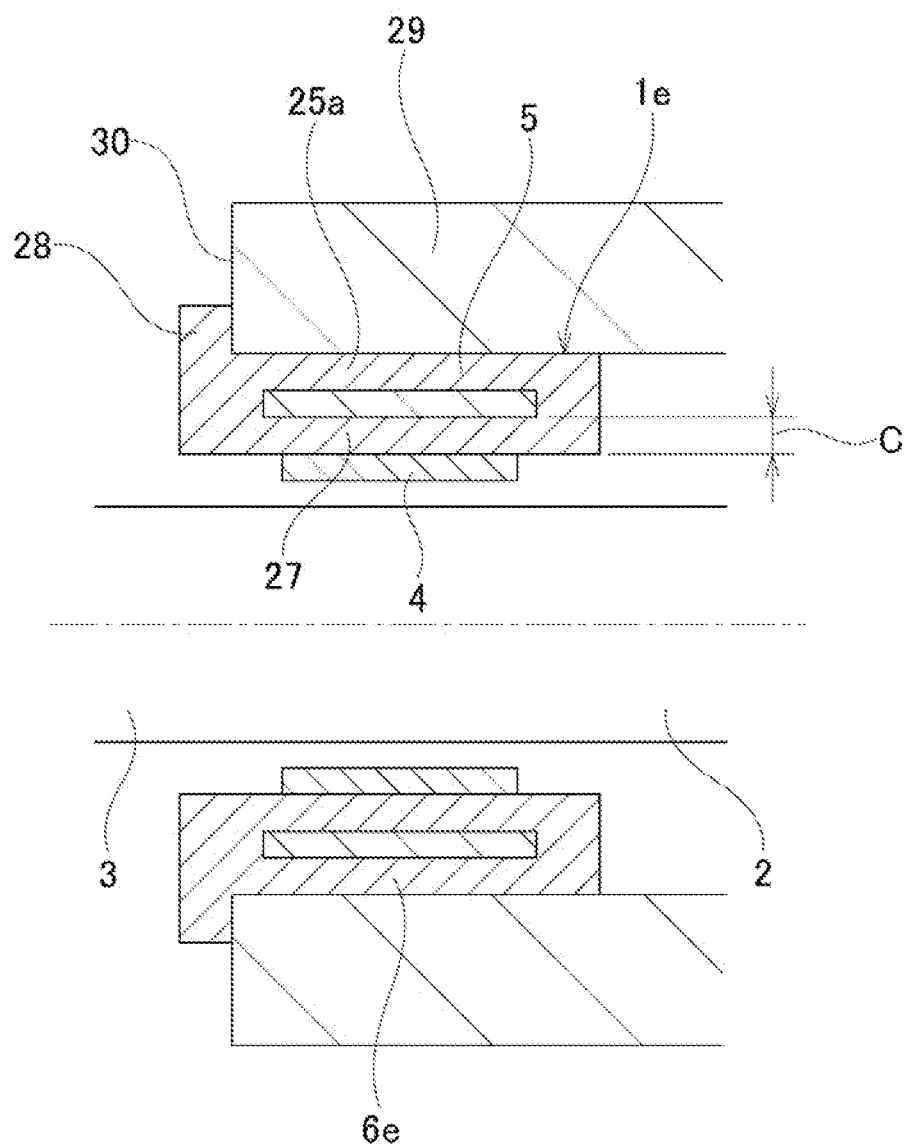
FIG. 11 is a cross-sectional view of a torque measuring device according to a sixth example of an embodiment of the present disclosure.

A sixth example of an embodiment of the present disclosure will be described with reference to FIG. 11.

In the torque measuring device 1e of this example, a holder 6e, in addition to a holder cylindrical portion 25a, includes an outward facing flange portion 28 around the entire circumference that protrudes outward in the radial direction from an end portion on one side in the axial direction (the left side in FIG. 11) of the holder cylindrical portion 25a.

In this example, it is possible, for example, to position the torque measuring device 1e in the axial direction with respect to a casing 29 by fitting the holder cylindrical portion 25a into an inner peripheral surface of the casing 29, and abutting the outward facing flange portion 28 against an axially facing side surface 30 of the casing 29. Other configurations and effects are the same as those of the fifth example.

Seventh Example

Figure 12:
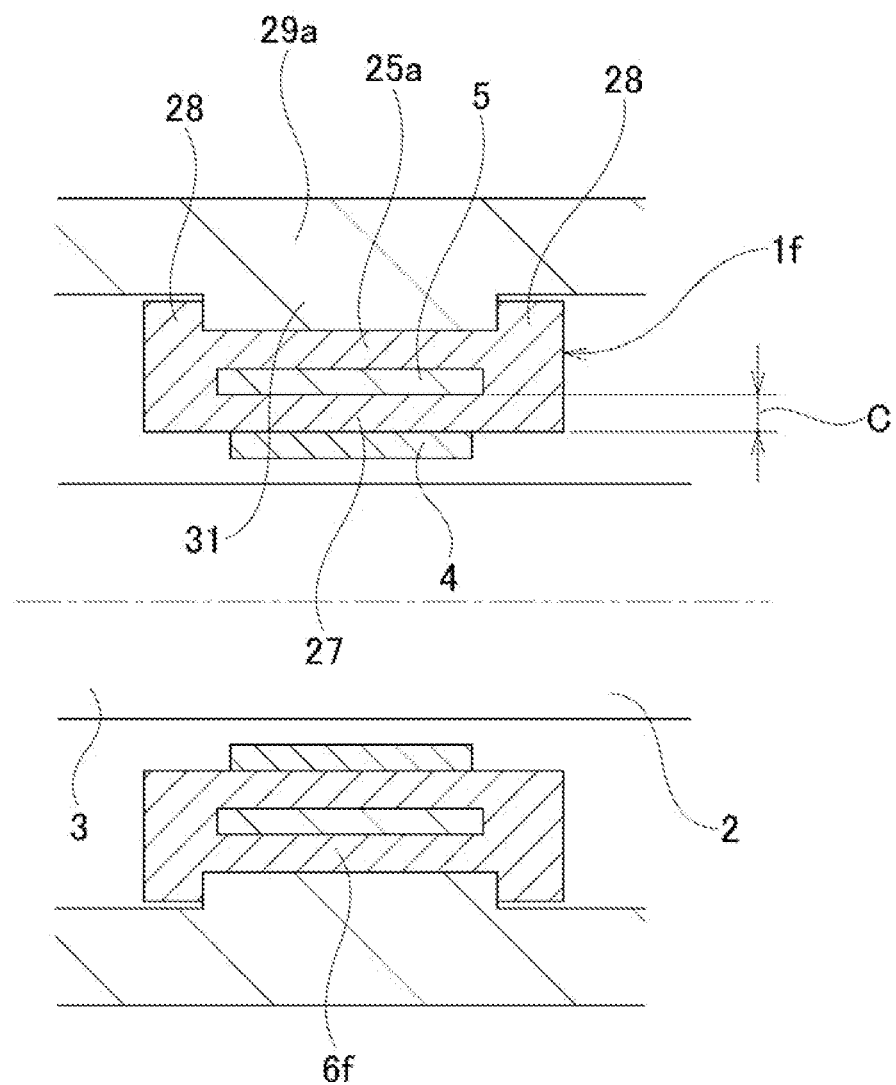
FIG. 12 is a cross-sectional view of a torque measuring device according to a seventh example of an embodiment of the present disclosure.

A seventh example of an embodiment of the present disclosure will be described with reference to FIG. 12.

In a torque measuring device 1f of the present example, a holder 6f is made of an elastomer including rubber, and in addition to a holder cylindrical portion 25a, has, over the entire circumference, two outward facing flange portions 28 that protrude outward in the radial direction from both end portions in the axial direction of the holder cylindrical portion 25a.

In this example, it is possible, for example, to position the torque measuring device if in the axial direction with respect to a casing 29a by fitting the holder cylindrical portion 25a into an inner peripheral surface of a convex portion 31 that protrudes over the entire circumference inward in the radial direction from a portion of the casing 29a in the axial direction, and sandwiching the convex portion 31 on both sides in the axial direction by the two outward facing flange portions 28.

Note that when performing the work of fitting the holder cylindrical portion 25a into the inner peripheral surface of the convex portion 31, one of the two outward facing flange portion portions 28 is elastically reduced in diameter and is passed in the axial direction through the inner side in the radial direction of the convex portion 31. Other configurations and effects are the same as those of the fifth example.

Eighth Example

Figure 13:
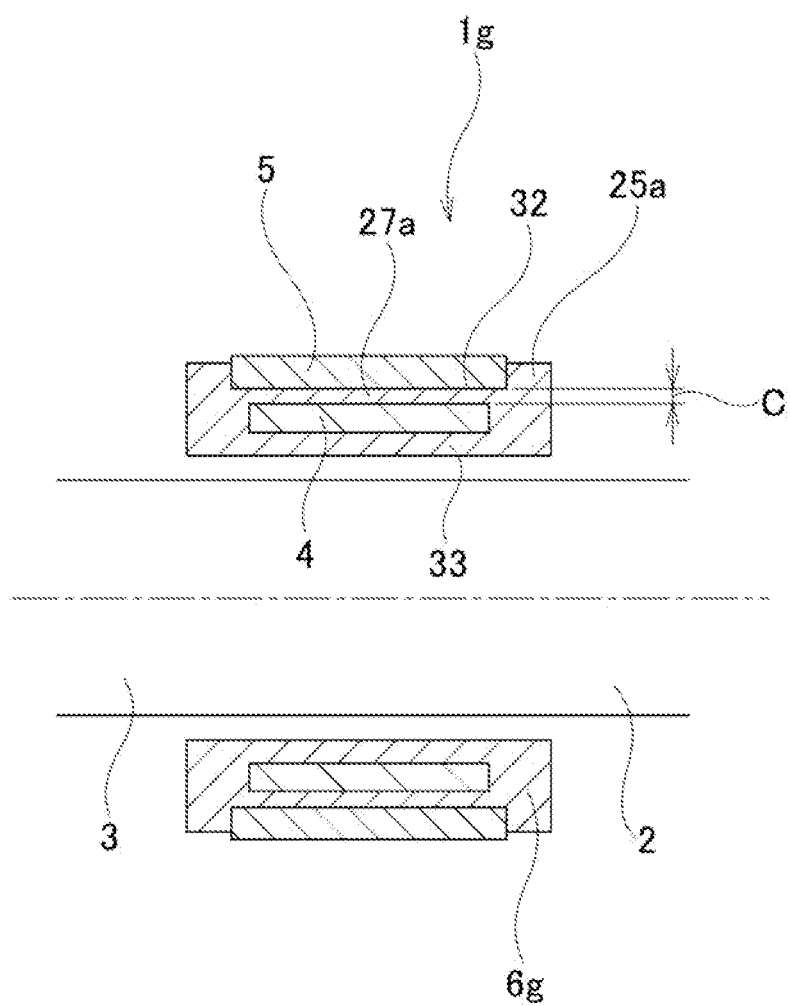
FIG. 13 is a cross-sectional view of a torque measuring device according to an eighth example of an embodiment of the present disclosure.

An eighth example of an embodiment of the present disclosure will be described with reference to FIG. 13.

In a torque measuring device 1g of this example, a holder 6g is formed into a cylindrical shape as a whole using a non-conductive material such as an elastomer including rubber or a synthetic resin, and has a holder cylindrical portion 25b having a cylindrical shape, and more specifically, includes only the holder cylindrical portion 25b. In this example, a coil unit 4 is embedded in the holder cylindrical portion 25b while being arranged coaxially with the holder cylindrical portion 25b. As a result, an entire surface of the coil unit 4 is covered by the holder cylindrical portion 25b.

The holder cylindrical portion 25b has a concave portion 32 over the entire circumference in an intermediate portion in the axial direction of the outer peripheral surface. In this example, the back yoke 5 is arranged coaxially with the holder cylindrical portion 25b by being fitted onto the holder cylindrical portion 25b in a state where an inner portion in the radial direction thereof is engaged with the concave portion 32 of the holder 6g.

In this example, of the holder cylindrical portion 25b, a cylindrical sandwiched portion 27a that is a portion sandwiched between an outer peripheral surface of the coil unit 4 and an inner peripheral surface of the back yoke 5 corresponds to a spacer and forms a clearance C. In addition, of the holder cylindrical portion 25b, an inner end portion 33 in the radial direction having a cylindrical shape, which is a portion on the inner side in the radial direction of the inner peripheral surface of the coil unit 4, forms an inner protective portion.

In this example, the sandwiched portion 27a is sandwiched between the outer peripheral surface of the coil unit 4 and the inner peripheral surface of the back yoke 5, and thus it is easy to ensure coaxiality between the coil unit 4 and the back yoke 5, and it is easy to maintain the coaxiality. An inner portion in the radial direction of the back yoke 5 is engaged with the concave portion 32 of the holder 6g, and thus it becomes easy to position the back yoke 5 in the axial direction with respect to the holder 6g.

In this example, when assembling the torque measuring device 1g around the rotating shaft 2, the inner end portion 33 in the radial direction of the holder cylindrical portion 25b can prevent the inner peripheral surface of the coil unit 4 from colliding with the outer peripheral surface of the rotating shaft 2. Other configurations and effects are the same as those of the first example.

Ninth Example

Figure 14:
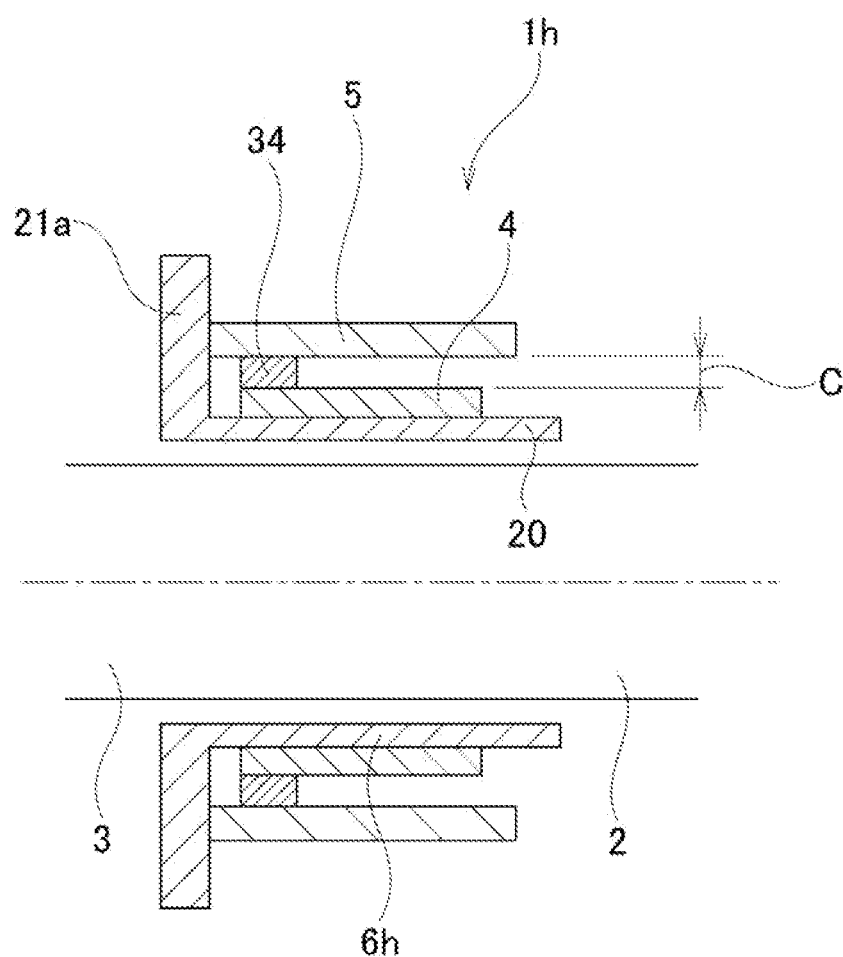
FIG. 14 is a cross-sectional view of a torque measuring device according to a ninth example of an embodiment of the present disclosure.

A ninth example of an embodiment of the present disclosure will be described with reference to FIG. 14 and FIGS. 15A-15B.

In a torque measuring device 1h of this example, a cylindrical spacer 34 made of an elastomer including rubber is sandwiched between an outer peripheral surface of a coil unit 4 and an inner peripheral surface of a back yoke 5.

Figure 15A:
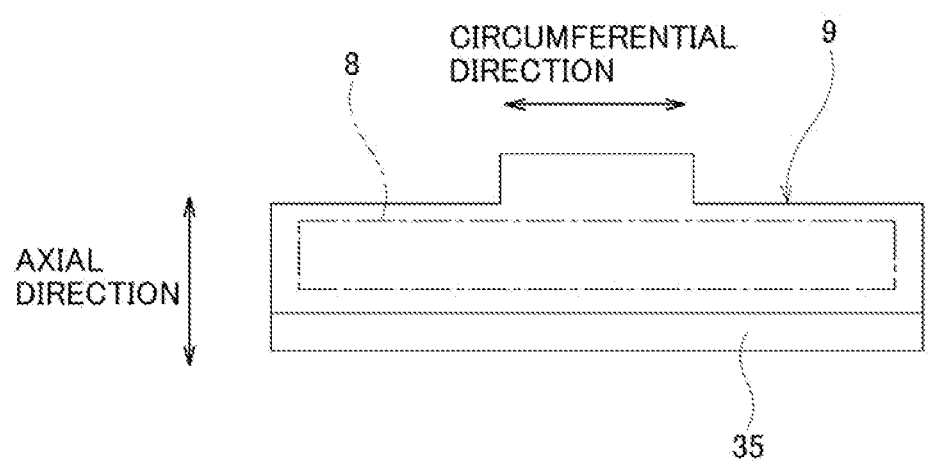
FIG. 15A is a developed view of a flexible substrate of a coil unit of the ninth example.
Figure 15B:
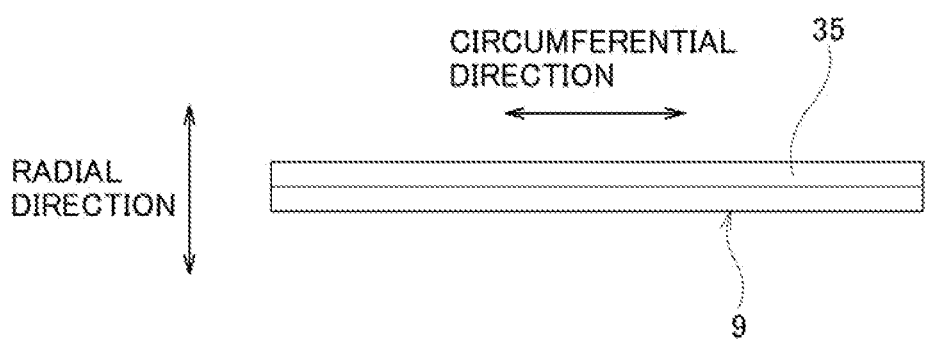
FIG. 15B is a view as seen from below the flexible substrate in FIG. 15A.

In this example, the spacer 34, as illustrated in FIG. 15A and FIG. 15B, is configured by a band-shaped member 35 that is adhesively fixed over an entire length thereof to one side surface, which, of both side surfaces in a plate thickness direction of a band-shaped flexible substrate 9 of a coil unit 4, is a side surface on the side (upper side in FIG. 15B) that becomes an outer peripheral surface of the coil unit 4. That is, the spacer 34 is configured by a band-shaped member 35 rolled into a cylindrical shape together with the flexible substrate 9.

More specifically, in this example, the spacer 34 is arranged at an end portion on one side (left side in FIG. 14) in the axial direction between the outer peripheral surface of the coil unit 4 and the inner peripheral surface of the back yoke 5. For this reason, in this example, the band-shaped member 35 of the spacer 34 is adhesively fixed to an end portion of one side (lower side in FIG. 15A) of one side surface of the flexible substrate 9 that is separated from the detection coil 8 in the width direction.

Therefore, in this example, a clearance C is configured by the spacer 34 and a cylindrical space between the outer peripheral surface of the coil unit 4 and the inner peripheral surface of the back yoke 5. However, when carrying out the present disclosure, the spacer may also be arranged at axial positions and axial ranges of the space between the outer peripheral surface of the coil unit 4 and the inner peripheral surface of the back yoke 5 that differ from this example, such as an intermediate portion in the axial direction, an end portion on the other side (right side in FIG. 14) in the axial direction, or the entire range in the axial direction.

Note that in this example, a holder annular portion 21a forming a holder 6h has a uniform plate thickness as a whole.

In this example, the spacer 34 is sandwiched between the outer peripheral surface of the coil unit 4 and the inner peripheral surface of the back yoke 5, and thus it is easy to ensure coaxiality between the coil unit 4 and the back yoke 5, and it is easy to maintain the coaxiality. Other configurations and effects are the same as those of the first example.

Tenth Example

A tenth example of an embodiment of the present disclosure will be described with reference to FIGS. 16A and 16B and FIGS. 17A and 17B.

In a torque measuring device 1i of this example, a cylindrical spacer 34a made of an elastomer including rubber is arranged over an entire range in the axial direction between an outer peripheral surface of a coil unit 4 and an inner peripheral surface of a back yoke 5. Therefore, in this example, a clearance C is configured by the spacer 34a.

Figure 17A:
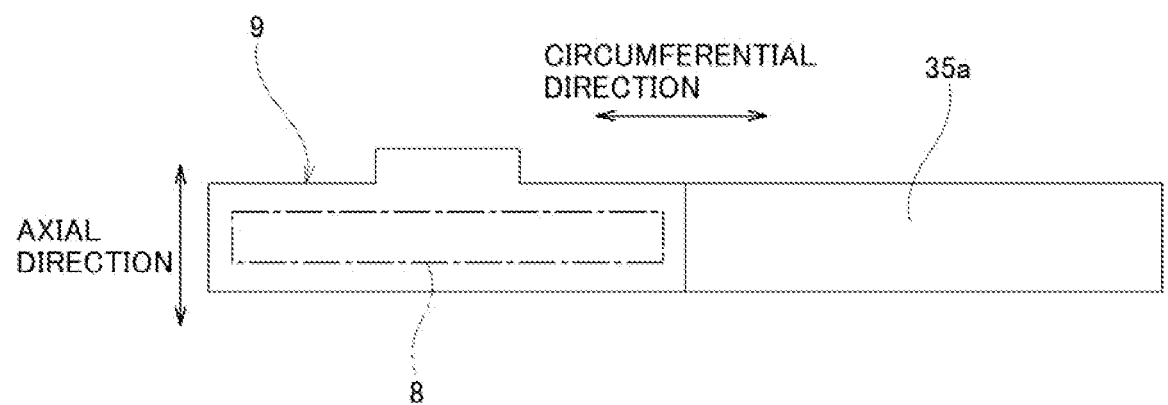
FIG. 17A is a developed view of a flexible substrate of a coil unit of the tenth example.
Figure 17B:
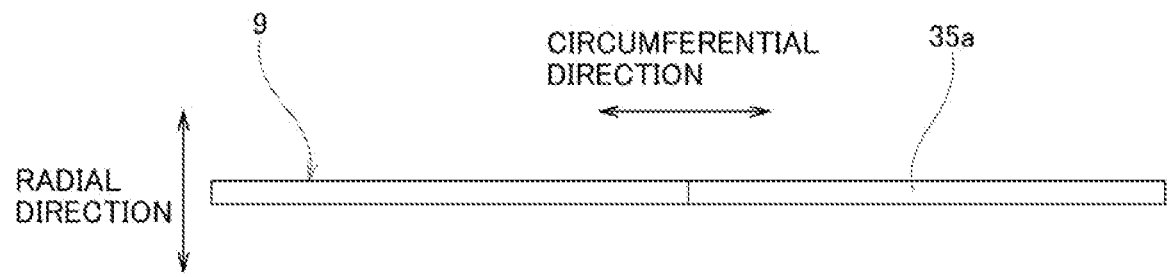
FIG. 17B is a view as seen from below the flexible substrate in FIG. 17A.

In this example, the spacer 34a is configured by a band-shaped member 35a as illustrated in FIG. 17A and FIG. 17B. An end portion on one side (left side in FIGS. 17A and 17B) in the longitudinal direction of the band-shaped member 35a is adhesively fixed to an end portion on one side (right side in FIGS. 17A and 17B) in the longitudinal direction of the band-shaped flexible substrate 9 of the coil unit 4.

Figure 16A:
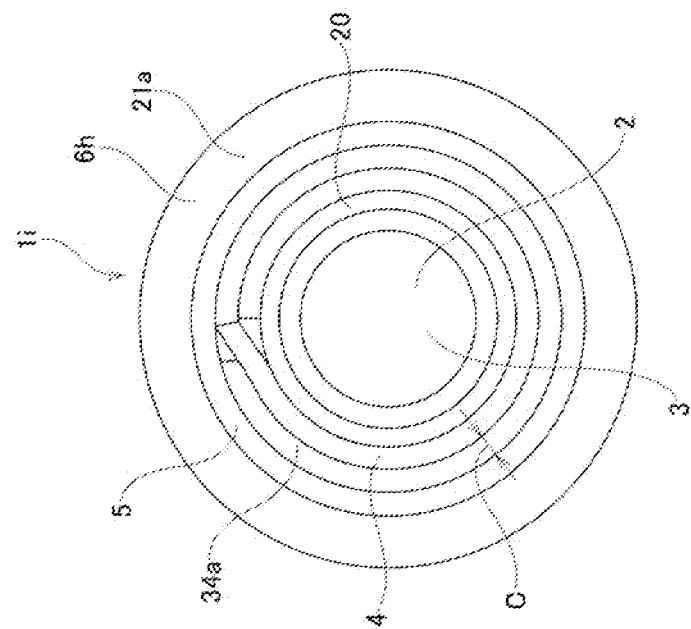
FIG. 16A is a cross-sectional view of a torque measuring device according to a tenth example of an embodiment of the present disclosure.
Figure 16B:
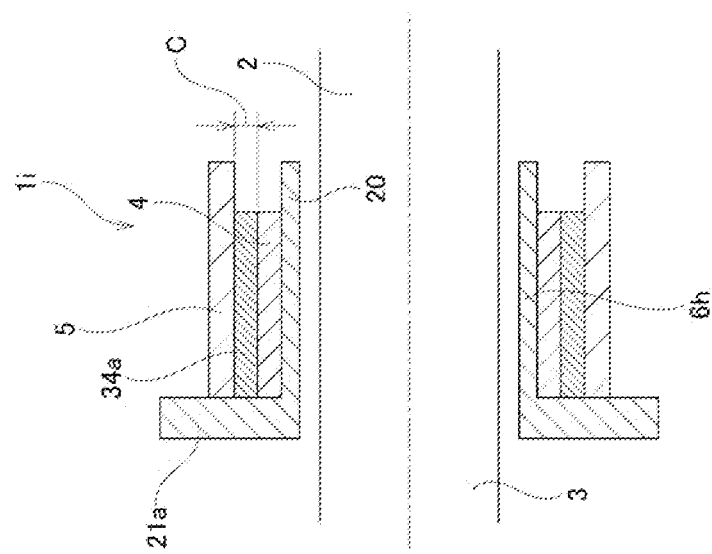
FIG. 16B is a view of the torque measuring device as viewed from the right side of FIG. 16A.

As illustrated in FIG. 16B, the spacer 34a is formed by rolling a band-shaped member 35a into a cylindrical shape on the outer peripheral surface of the coil unit 4 having a cylindrical shape, which is formed by rolling a flexible substrate 9 into a cylindrical shape. In other words, in this example, after forming the coil unit 4 having a cylindrical shape by winding the flexible substrate 9 cylindrically around the outer peripheral surface of the holder cylindrical portion 25 of the holder 6a, the cylindrical spacer 34a is formed by winding the band-shaped member 35a around the outer peripheral surface of the coil unit 4 in a cylindrical shape.

In this example as well, the spacer 34a is sandwiched between the outer peripheral surface of the coil unit 4 and the inner peripheral surface of the back yoke 5, and thus it is easy to ensure coaxiality between the coil unit 4 and the back yoke 5, and it is easy to maintain the coaxiality. Other configurations and effects are the same as those of the ninth example.

The construction in the embodiments described above can be implemented in combination as appropriate within a range that does not cause contradiction.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting.

It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

REFERENCE SIGNS LIST 1, 1a, 1b, 1c, 1d, 1e, 1f, 1g, 1h, 1i Torque measuring device
2 Rotating shaft
3 Intermediate shaft portion
4 Coil unit
Back yoke
6, 6a, 6b, 6c, 6d, 6e, 6f, 6g, 6h Holder
7 Electronic circuit
8 Detection coil
9 Flexible substrate
10 First split coil
11 Second split coil
12 Third split coil
13 Fourth split coil
14 Coil piece
15 Coil piece
16 Coil piece
17 Coil piece
18 Oscillator
19 Lock-in amplifier
20 Inner cylindrical portion
21, 21a Holder annular portion
22 Thick portion
23 Thin portion
24 Stepped portion
25, 25a, 25b Holder cylindrical portion
26 Inward facing flange portion
27, 27a Sandwiched portion
28 Outward facing flange portion
29 Casing
30 Axially facing side surface
31 Convex portion
32 Concave portion
33 Inner end portion in the radial direction
34, 34a Spacer
35, 35a Band-shaped member

The invention claimed is:

1. A torque measuring device, comprising:
a coil unit formed into a cylindrical shape as a whole and having a detection coil configured to change a voltage in response to a change in magnetic permeability of a magnetostrictive effect section of a rotating shaft, the magnetic permeability changing according to torque to be transmitted;
a back yoke formed in a cylindrical shape and arranged coaxially around the coil unit;
a holder configured to hold the coil unit and the back yoke; and
an electronic circuit including the detection coil and configured to generate an output voltage according to a voltage of the detection coil; wherein
a clearance in a radial direction is provided between an outer peripheral surface of the coil unit and an inner peripheral surface of the back yoke; and
a range of change in the clearance which accompanies temperature change during use is regulated to a range in which a change in the output voltage is linear with respect to the change in the clearance.

2. The torque measuring device according to claim 1, wherein
a spacer is provided and sandwiched between the outer peripheral surface of the coil unit and the inner peripheral surface of the back yoke, and the clearance is formed by the spacer.

3. The torque measuring device according to claim 2, wherein
the holder has a holder cylindrical portion, and the holder cylindrical portion forms the spacer;
the coil unit is fitted into the holder cylindrical portion; and
the back yoke is fitted onto the holder cylindrical portion.

4. The torque measuring device according to claim 3, wherein
the holder has an inner protection portion positioned on an inner side in the radial direction of the coil unit; and
the holder includes an inward facing flange portion that protrudes inward in the radial direction from at least one of end portions on both sides in an axial direction of the holder cylindrical portion, the inward facing flange portion has an inner end portion in the radial direction positioned on the inner side in the radial direction of the inner peripheral surface of the coil unit, and the inner end portion in the radial direction of the inward facing flange portion forms the inner protection portion.

5. The torque measuring device according to claim 3, wherein
the holder has an inner protection portion positioned on an inner side in the radial direction of the coil unit, and a holder cylindrical portion;
the coil unit is embedded in the holder cylindrical portion;

the back yoke is fitted onto the holder cylindrical portion;

a part of the holder cylindrical portion located between the outer peripheral surface of the coil unit and the inner peripheral surface of the back yoke forms the spacer; and a portion of the holder cylindrical portion located on the inner side in the radial direction of the inner peripheral surface of the coil unit forms the inner protection portion.

6. The torque measuring device according to claim 2, wherein the holder has a holder cylindrical portion;

the back yoke is embedded in the holder cylindrical portion; and a portion of the holder cylindrical portion located between the inner peripheral surface of the back yoke and the outer peripheral surface of the coil unit forms the spacer.

7. The torque measuring device according to claim 2, wherein the coil unit is configured by a flexible substrate; and a band-shaped member fixed to the flexible substrate is sandwiched between the outer peripheral surface of the coil unit and the inner peripheral surface of the back yoke, and the band-shaped member forms the spacer.

8. The torque measuring device according to claim 7, wherein the holder has an inner protection portion positioned on an inner side in the radial direction of the coil unit;

the holder further has an inner cylindrical portion arranged on the inner side in the radial direction of the coil unit, and the inner cylindrical portion forms the inner protection portion.

9. The torque measuring device according to claim 1, wherein the holder has an inner protection portion positioned on an inner side in the radial direction of the coil unit.

10. The torque measuring device according to claim 9, wherein the holder has an inner cylindrical portion arranged on the inner side in the radial direction of the coil unit, and the inner cylindrical portion forms the inner protection portion.

11. The torque measuring device according to claim 1, wherein the coil unit is configured by a flexible substrate.

* * * * *